Nov. 5, 1957 T. C. CRABTREE, JR 2,811,743
GROUND MEAT KNITTING DEVICE
Filed Aug. 12, 1957 2 Sheets-Sheet 1

TOBY C. CRABTREE JR.
*INVENTOR.*

BY Loyal J. Miller
ATTORNEY

Nov. 5, 1957

T. C. CRABTREE, JR 2,811,743

GROUND MEAT KNITTING DEVICE

Filed Aug. 12, 1957

TOBY C. CRABTREE JR.
INVENTOR.

ATTORNEY

United States Patent Office 2,811,743
Patented Nov. 5, 1957

2,811,743
GROUND MEAT KNITTING DEVICE

Toby C. Crabtree, Jr., Oklahoma City, Okla., assignor of one-half to William L. Murphy, Oklahoma City, Okla.

Application August 12, 1957, Serial No. 677,477

9 Claims. (Cl. 17—26)

The present invention relates to food handling and preparation, and more particularly to a device for interweaving or knitting the fibers of ground meat.

The present invention is a continuation-in-part of an application filed by me in the United States Patent Office on May 21, 1956, Serial No. 586,041, for Ground Meat Knitting Device.

Apparatus for tenderizing meat is well known in the meat preparation art and in general comprises means for cutting, slitting or crushing the fibers of the meat, such as disclosed in Patent No. 2,622,269, issued to Berglund and Karp. It is in combination with such an apparatus that the present invention is designed to be used.

The present invention comprises a series of metallic disks having a plurality of radially spaced-apart tip ends or teeth on their peripheries. These disks replace the cutting knives carried by the power driven rotating shafts of the tenderizing machine in tip end overlapping relation.

The principal object of the present invention is to provide a device to be used in combination with a meat tenderizing machine which will intermingle or weave the relatively short fibers of ground meat together, in contradistinction to or with the normal product of a meat tenderizing machine.

Another important object of this invention is to provide a device of this character which will so interweave the fibers of a substantially flat section of ground meat that the same may be picked up and suspended by one edge thereof.

An additional object is to provide a device of this class which will provide a "steak" of ground meat having the relatively short fibers of the meat interwoven to such an extent that the "steak" must be practically cut apart.

A further object is to provide a device of this class which may be easily cleaned, and which in no way will harm or contaminate the ground meat when interweaving the fibers of the same.

Still another object is to provide a device of this character which may be easily connected to and used with conventional tendering machines presently in use which have parallel power driven rotating shafts.

It is to be understood that the terms "interweaving," "knitting" and "intermingling" of the ground meat fibers, as used herein, does not refer to compacting or compressing the ground meat, which is the present conventional manner of arranging ground meat for cooking. The closely spaced-apart overlapping tip ends or teeth of the rotating disks of the invention tend to force the short fibers of the ground meat together and between the segmented portions thereof in a manner that the fibers are substantially "knitted" together.

Other objects will be apparent from the following description when taken in conjunction with the accompanying two sheets of drawings, wherein.

Like characters of reference designate like parts in those figures of the drawings in which they occur.

In the drawings.

Figure 1:
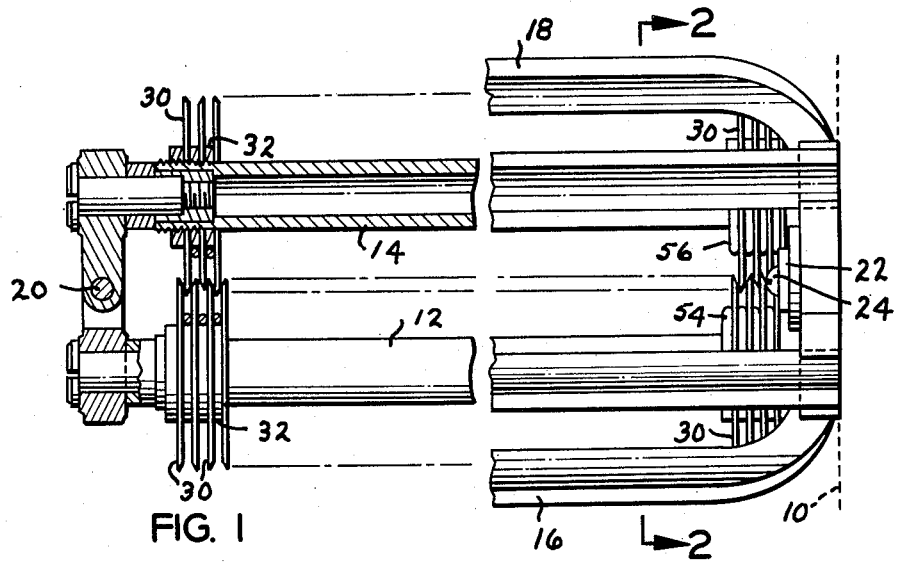
Figure 1 is a fragmentary plan view, partly in section, of the shaft assembly of a meat tenderizing machine with the disks of the present invention installed thereon.

The reference numeral 10 indicates the housing surrounding the motor and gear train of a conventional meat tenderizing machine adapted to support and drive a pair of parallel shafts 12 and 14 which are rotatably carried by U-shaped frames 16 and 18 pivotally connected adjacent their ends opposite the housing by a pin 20. Latch plate means 22 and screws 24 removably connect the frames 16 and 18 to the housing in a conventional manner.

Figure 2:
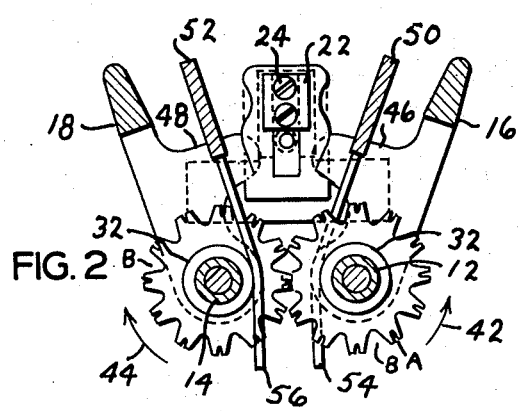
Figure 2 is a vertical sectional view, on a reduced scale, taken substantially along line 2—2 of Fig. 1.

As shown in Figs. 1 and 2, a plurality of ground meat knitting disks 30 are axially mounted on the respective shafts 12 and 14 in uniformly spaced-apart interdigitated relation by means of spacing rings 32.

Inwardly extending bracket portions 46 and 48, of the respective frames 16 and 18, respectively receive and support the upper flat bar portions 50 and 52 of a pair of meat guide combs which serve to guide the meat through and away from the knitting disks 30. The guide combs comprise a plurality of rod-like wires 54 and 56 which are connected to and depend from the lower edge of the respective bar portions 50 and 52. The wires 54 extend downwardly from the bar 50 on the inward side of the shaft 12 between the disks 30, terminating a selected distance therebelow. Similarly, the wires 56 extend downwardly from the bar 52 adjacent the inward side of the shaft 14 and between the disks 30 thereon. The diameter of the wires 54 and 56 is such that they substantially fill the transverse space between the respective disks 30, without frictional contact therewith. Thus, the wires 54 and 56 form a guide or guard for directing the meat toward the revolving disks at the upper side of the machine and prevent the meat from hanging or clinging to the disks after passing between the latter.

The above description is more or less conventional with meat tenderizing machines, and forms no part of the present invention other than to illustrate a workable combination with which the disks 30 of the instant invention are designed to be used.

Figure 3:
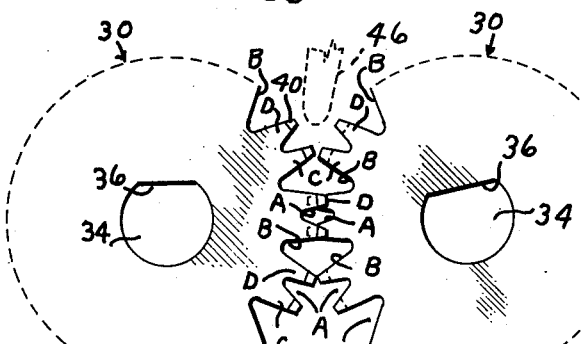
Figure 3 is an enlarged elevational view of one pair of the disks in operating relation.

A pair of the disks 30 is shown in enlarged elevation in Fig. 3. They comprise substantially flat metallic disks centrally perforated, as at 34, providing one straight edge 36 subtending the wall of the bore. This bore 34 is adapted to be closely received by either one of the shafts 12 or 14 and provides a means for positive rotation of the disks with the shafts. Each disk 30 has an interrupted periphery formed by cutting a series of circumferential equally spaced-apart substantially V-shaped notches A in its periphery. Similarly, addition substantially V-shaped notches B are cut in the periphery of each disk in circumferential equally spaced-apart relation between the notches A, defining pairs of teeth C and D. The notches B are slightly greater circumferentially and extend further inwardly toward the axis of the disk than the notches A. Thus, the notches B may be considered as being deep, while the notches A are relatively shallow when compared with the notches B. The bottom of the V-shape of the respective notches A and B is formed on a small radius and the edges of the disk defining the V-shapes are perpendicular with respect to the plane of the disk. The circumferential width of each of the teeth C and D is substantially less than the circumferential width of the notches A. Each tooth C and D has its outer circumferential edge beveled on one side, as at 40, to form knife-like teeth. However, it is not essential that the teeth be beveled, since they may be left blunt-ended and still perform their function. Thus, the outer circumferential edges of the teeth C and D constitute portions of a circular arc based on the axis of rotation of the disks 30. It is to be noted that the circumferential width of each tooth C and D is preferably relatively small as contrasted with the wider meat slitting blades or knives of conventional tenderizers. The width of the teeth C and D may approach point size and still perform their intended function. The diameter of the disks 30 is such that the teeth C and D of the disks on one shaft are disposed in slightly overlapping relation with respect to the teeth of the disks on the other shaft. The disks 30 are positioned on the respective shafts 12 and 14 so that the pairs of teeth C and D of the disks on one shaft are co-operatively aligned in overlapping relation with the pairs of teeth C and D of the disks on the other shaft as the disks revolve with the shafts (Fig. 3), while the respective shallow notches A are similarly aligned.

*Operation*

In operation the disks 30 are assembled on a tenderizing machine such as disclosed hereinabove. Operation of the machine revolves the shaft 12 in a counter-clockwise direction, as shown by the arrow 42 (Fig. 2), so that the teeth C and D of the disks on this shaft are rotated downwardly toward the teeth of the disks carried by the opposite shaft 14. The shaft 14 is rotated in a clockwise direction, as shown by the arrow 44 (Fig. 2). A desired amount of meat, such as is commonly referred to as "hamburger meat," is arranged in substantially a flat section. A fragmentary section of such ground meat is shown in edge view by the dotted lines 46 (Fig. 2). The meat 46 is fed into the rotating disks 30 between the guide wires 54 and 56. The tips or teeth C and D, of the respective disks, contact the short fibers of the ground meat and intermingle them until the fibers are in effect knitted together, resulting in a mass of meat which will not separate or otherwise become disintegrated. This is accomplished by the multiplicity of the overlapping closely spaced tip ends contacting the meat fibers, while the edges of the disks defining the sides of the V-shaped notches contact the meat and co-act with the teeth to effect the knitting action.

Figure 4:
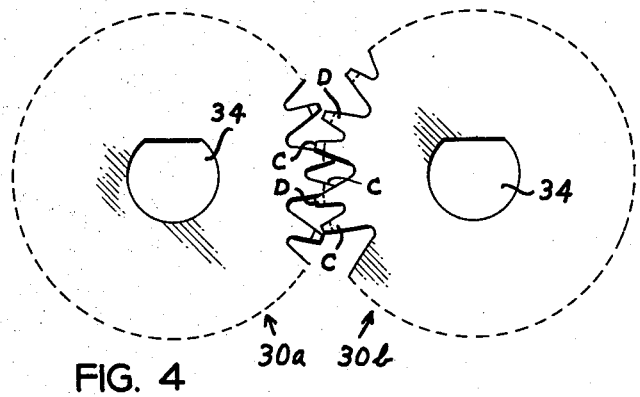
Figures 4, 5 and 6 are views similar to Fig. 3, illustrating alternate operating positions of the respective teeth of the disks.

In testing the operation of the disks 30, I have found that the disks may be arranged on the shafts 12 and 14 so that the notches A of the disks 30a on one shaft are aligned with the notches B of the disks 30b on the opposing shaft, thus disposing the respective pairs of teeth C and D in the position shown by Fig. 4, wherein the teeth C on the disk 30a substantially overlap the teeth D of the disks 30b on the opposite shaft, and still effectively knit the ground meat together.

Figure 6:
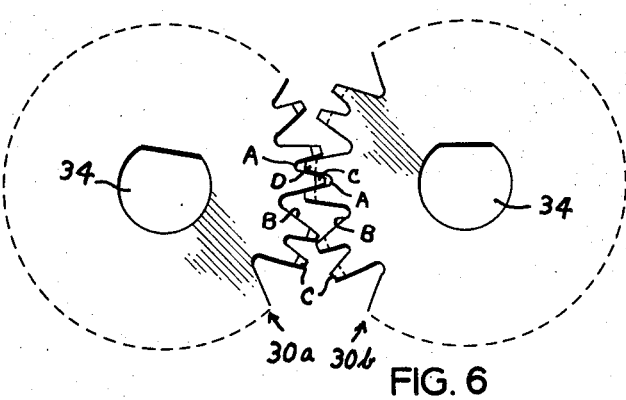

Another arrangement of the disks 30, which operates equally as well, is illustrated in Fig. 6, wherein the pairs of teeth C and D on one shaft are arranged in staggered relation. In other words, the teeth do not meet in mating overlapping relation. The tooth C on one disk 30a projects toward the shallow notch A on the opposing disk 30b, while the tooth D of the disk 30b projects toward the notch A of the disk 30a.

Figure 5:
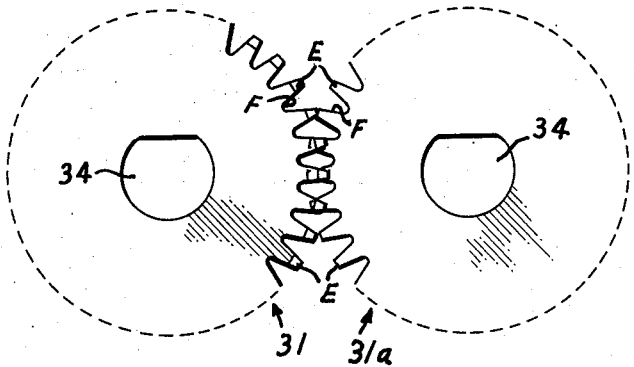

An alternate configuration of the disks is illustrated in Fig. 5, wherein the teeth E of the respective disks 31 and 31a are not formed in pairs, but are equally spaced around the periphery of the disks and are defined by a series of equal notches F formed in the periphery of the disks, similar in size and configuration to the V-shaped notches A of the disks 30. The disks 31 and 31a are disposed on the respective shafts 12 and 14, so that the teeth E on the disks 31 meet or mate in overlapping relation with the teeth E on the opposing disks 31a, as shown.

Further testing has revealed that the disks will knit together all fresh meat or meats irrespective of the form or shape thereof, thus knitting and combining the fibers thereof, and will also make a solid piece of meat more tender than conventional tenderizing cutting blades, provided that the solid meat is "cleaned up" and is free of all sinew, gristle, etc. This is accomplished through the knitting action of the disk teeth on the fiber of the solid meat.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A ground meat knitting device for use with a pair of parallel spaced-apart counter-rotating power driven shafts, including: a plurality of relatively thin disks adapted to be rigidly mounted axially on the shafts to form a pair of rows of disks in spaced-apart interdigitated peripheral overlapping relation, each of said disks having an interrupted periphery defining a plurality of equally spaced-apart substantially V-shaped notches and a plurality of spaced-apart teeth, the teeth of the respective adjacent disks on one shaft co-operating with the teeth of the disks on the other shaft for contacting and intermingling the short fibers of a mass of ground meat passed between the shafts.

2. A ground meat knitting device for use with a pair of parallel spaced-apart counter-rotating power driven shafts, including: a plurality of relatively thin disks adapted to be rigidly mounted axially on the shafts to form a pair of rows of disks, said disks each having a beveled edge and an interrupted periphery defining a plurality of spaced-apart substantially V-shaped notches and a plurality of spaced-apart teeth, the teeth of the respective adjacent disks on one shaft co-operating with the teeth of the disks on the other said shaft for contacting and intermingling the short fibers of a mass of ground meat passed between the shafts.

3. A ground meat knitting device for use with a pair of parallel spaced-apart counter-rotating power driven shafts, including: a plurality of relatively thin disks adapted to be rigidly mounted axially on the shafts to form a pair of rows of disks in peripheral overlapping relation, said disks each having a beveled peripheral edge and having a plurality of circumferentially spaced-apart substantially V-shaped notches defining a plurality of knife-like teeth, the free end portion of each of said teeth describing a comparatively short circumferential arc, the teeth of the respective adjacent disks on one said shaft co-operating with the teeth of the disks on the other said shaft for contacting and intermingling the short fibers of a mass of ground meat passed between the shafts.

4. Structure as specified in claim 3, in which alternate ones of the V-shaped notches are deepened toward the axis of each said disk to define a plurality of pairs of teeth on each respective disk, having a relatively shallow V-shaped notch between each respective pair of teeth, said pairs of teeth of each disk being angularly disposed with respect to the pairs of teeth on the adjacent disks.

5. Structure as specified in claim 4, in which said pairs of teeth of the disks on one said shaft are arranged in co-operative mating overlapping relation with the respective pairs of teeth of the disks on the other said shaft as the shafts are rotated.

6. Structure as specified in claim 4, in which said pairs of teeth and the shallow V-shaped notches of the disks on one said shaft are arranged for co-operative meeting and overlapping relation with the respective pairs of teeth and shallow V-shaped notches of the disks on the other said shaft as they are rotated.

7. Structure as specified in claim 4, in which said pairs of teeth of the disks on one said shaft are arranged for co-operative overlapping relation between the respective pairs of knife-like teeth of the disks on the other said shaft.

8. Structure as specified in claim 4, in which said pairs of teeth on one said shaft are arranged in staggered relation with respect to said pairs of teeth of the disks on the other said shaft.

9. Structure as specified in claim 3, in which alternate ones of the V-shaped notches are deepened toward the axis of each disk to define a plurality of pairs of teeth on each respective disk and a relatively shallow V-shaped notch between each respective pair of knife-like teeth, the free end portion of each of said teeth describing a comparatively short circumferential arc, the circumferential arc of said teeth being less than the spacing between the teeth.

References Cited in the file of this patent
UNITED STATES PATENTS

| | | |
|---|---|---|
| 2,251,801 | Plitt, et al. | Aug. 5, 1941 |
| 2,360,729 | Spang | Oct. 17, 1944 |
| 2,398,636 | Henney et al. | Apr. 16, 1946 |
| 2,607,951 | Moree | Aug. 26, 1952 |
| 2,607,952 | McIntosh | Aug. 26, 1952 |
| 2,622,269 | Berglund et al. | Dec. 23, 1952 |
| 2,718,028 | Read et al. | Sept. 20, 1955 |